United States Patent Office 2,716,300
Patented Aug. 30, 1955

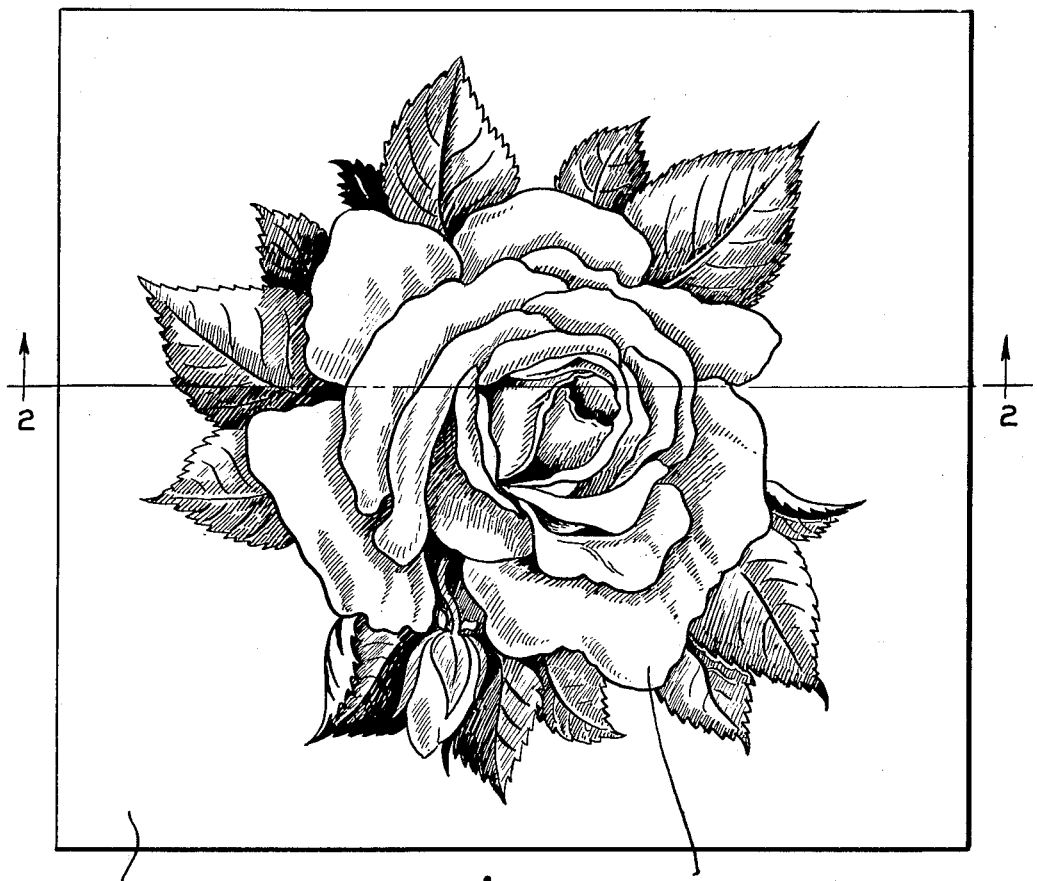

2,716,300

DECORATED GLASS ARTICLE AND METHOD OF MAKING IT

Harold F. Bopp, Corning, N. Y., assignor to Corning Glass Works, Corning, N. Y., a corporation of New York Application March 25, 1953, Serial No. 344,597

7 Claims. (Cl. 41—26)

This invention relates to the production of ornamental glassware fabricated from photosensitive glass and having ceramic surface decorations applied thereto. It is particularly concerned with the provision of ware in which new and unusual ornamental effects are achieved by combining the individual characteristics of photosensitive glass and ceramic surface decoration.

A photosensitive glass is one in which exposure to short-wave radiations, such as ultraviolet radiations, causes an invisible change in the glass as a result of which irradiated areas are capable of heat-developed coloration or opacification while at the same time non-irradiated areas remain substantially unchanged by such heating. Such photothermally developed coloration or opacification may be three-dimensional and extend into or through the glass or it may be confined to a thin layer at the surface. Such procedure is used primarily in producing three-dimensional colored or opal designs and photographs in glass. It is difficult as yet, however, to obtain a variety of color effects in such glasses and hence a developed image is, as a practical matter, restricted to a limited range of colors.

A surface design in practically any combination of colors may be produced on glass by the aplication of a suitable ceramic glaze or enamel thereto. Such decoration, however, is two-dimensional, and insofar as I am aware, three-dimensional effects within a glass article have never been produced thereby nor in combination therewith.

I have now discovered that such ceramic designs have selective absorption and reflection for short-wave radiations and that, when such a design is applied to a photosensitive glass and the glass is irradiated through the design and then thermally developed, a three-dimensional image is formed within the glass which complements the ceramic design on its surface and portions of the design which are transparent or partially transparent to the irradiation are in register with a corresponding image in the glass while portions of the design which are opaque to the irradiation are in register with a corresponding transparent portion of the glass. Thus the ceramic design on the surface is reinforced and amplified by its image within the glass and an unusual and novel decorative effect is obtained. Portions of the glass which were shielded from the irradiation, of course, remain photosensitive and an additional image can be produced therein, if desired, by subsequent reexposure and heat-development, the existing design being carefully shielded from further irradiation.

When viewed through the surface opposite that to which the ceramic design is applied, the image within the glass and the ceramic design on its surface combine to produce an unusual three-dimensional effect in which any colors of the ceramic design are modified and enhanced by the color or translucency of its image within the glass. This novel effect is particularly pleasing in such articles as tableware, glass tiles and lighting shades and it may be used to advantage in any type of glassware wherein an ornamental effect is desired.

My invention broadly comprises a glass article having a design composed of a ceramic enamel or glaze integrally united with a surface of the glass and a three-dimensional photographic image within the glass in register with and complementing the ceramic design.

With reference to the accompanying drawing, Fig. 1 is a plan view of a glass sheet having on one face a fired-on enamelled design, the glass sheet having opacified and unopacified portions complementing the design in accordance with my invention.

Fig. 2 is a sectional view with exaggerated thickness taken on the line 2—2 of Fig. 1 showing the varying extent of the opacified portions within the glass sheet.

Photosensitive glasses capable of producing colored images by various photosensitizing metals are disclosed in the following United States patents: No. 2,515,936 which discloses the use of silver; No. 2,515,937 gold; No. 2,515,938 copper; and No. 2,515,275 gold, silver or copper. Photosensitive glasses in which images may be formed by various light-diffusing or opacifing crystallites are disclosed in the following United States patents: No. 2,515,940 which discloses crystallites of lithium silicate; No. 2,515,941 barium disilicate; and No. 2,515,943 an alkali metal fluoride. Any other photosensitive glass may be utilized for the present purpose, however.

Suitable ceramic glazes and enamels can be produced in practically any desired color and/or degree of opacity, and the transmission and absorption of a design composed thereof for short-wave radiations will depend upon the composition, color and thickness of the enamel or glaze. A design of uniform thickness composed of an enamel having a high content of PbO or other ultraviolet-absorbing material has a substantial overall absorption for short-wave radiations. Absorption is greater if the thickness of the glaze or enamel is increased. With colored enamels, dark shades generally transmit less than light tints. Organic materials employed as vehicles, binders or varnishes in preparing or applying the ceramic design have a substantial absorption per se for short-wave radiations and their elimination from the design by heating the coated glass before irradiation is desirable.

The glaze or enamel may be applied by brushing, stencilling, silk-screening, spraying or the like to form the desired design on the glass or it may be applied as a decalcomania. Lithographic decalcomanias, wherein the ceramic material is printed in an orderly arrangement of dots, permit a desirable variant effect. The light areas or high lights of such decalcomanias permit irradiation of the underlying glass and the subsequent development of a corresponding image of varying density within the glass thus creating an unusual three-dimensional effect. This is particularly effective in landscapes and other designs showing clouds printed on a photosensitively opacifiable glass wherein three-dimensional opacified areas corresponding to the clouds may be developed in the glass.

In producing the ornamental article of this invention a ceramic design is applied to the surface of an article composed of a photosensitive glass. The decorated glass article is then heated sufficiently to eliminate organic material, if present, from the design and to cause adherence of the enamel or glaze to the glass surface. While the heating at this stage may, if desired, be sufficiently prolonged to completely mature the enamel or glaze, it is preferable to finally mature the same simultaneously with the subsequent thermal development of the image in the glass; and for this reason the nature of the enamel or glaze is advantageously such that it can be matured at a temperature sufficiently low to avoid deformation of the ware.

The glass article is then exposed through its decorated surface to a short-wave radiation source, preferably a carbon arc, in accordance with procedures disclosed in the above-mentioned patents to form a latent image in the exposed portions of the glass. The exposed article is then heated as by passing it through a decorating lehr to thermally develop the latent image into a visible colored or opacified image and at the same time to mature the ceramic surface design. Advantageously such heat treatment is carried out at a temperature about 100° C. below the softening point of the glass.

What is claimed is:

1. A glass article having a design composed of a ceramic enamel integrally united with a surface of the glass and a three-dimensional photographic image within the glass in register with and complementing the ceramic design.

2. A glass article according to claim 1 in which the photographic image consists of a photothermally developed coloration comprising a dispersed colloidal metal selected from the class consisting of gold, silver and copper.

3. A glass article according to claim 1 in which the photographic image consists of a photothermally developed opacification.

4. A glass article according to claim 1 in which the ceramic enamel is colored.

5. The method of producing an ornamental glass article which comprises forming on a surface of a body composed of a photosensitive glass a design composed of a ceramic enamel, exposing the glass body through said design to short-wave radiations to form a three dimensional latent image within the glass, and thereafter heating the article to convert the latent image to a visible image.

6. The method of producing an ornamental glass article which comprises applying to a surface of a photosensitive glass body a design composed of a ceramic enamel, heating the glass body to sinter the design, exposing the glass body through the sintered design to short-wave radiations to form a three dimensional latent image within the glass complementing the design, and thereafter heating the article to convert the latent image to a visible image and to fuse the ceramic design to the glass surface.

7. The method of producing an ornamental glass article which comprises applying to a surface of a photosensitive glass body a design composed of a ceramic enamel, heating the glass body to sinter the design, exposing the glass body through said design to short-wave radiations to form a three dimensional latent image within the glass complementing the design, and thereafter heating the article to a temperature approximately 100° C. below the softening point of the glass for a time sufficient to develop the latent image into a visible image within the glass and to fuse the ceramic design to the glass surface.

References Cited in the file of this patent

UNITED STATES PATENTS

| | | |
|---|---|---|
| 2,266,926 | Vida | Dec. 23, 1941 |
| 2,472,128 | Staehle | June 7, 1949 |
| 2,515,941 | Stookey | July 18, 1950 |
| 2,515,943 | Stookey | July 18, 1950 |
| 2,658,311 | Goddard | Nov. 10, 1953 |